United States Patent
He et al.

(10) Patent No.: US 11,762,658 B2
(45) Date of Patent: Sep. 19, 2023

(54) MATRIX MULTIPLICATION UNIT WITH FLEXIBLE PRECISION OPERATIONS

(71) Applicant: ADVANCED MICRO DEVICES, INC., Santa Clara, CA (US)

(72) Inventors: Bin He, Orlando, FL (US); Michael Mantor, Orlando, FL (US); Jiasheng Chen, Orlando, FL (US); Jian Huang, Orlando, FL (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 713 days.

(21) Appl. No.: 16/581,252

(22) Filed: Sep. 24, 2019

(65) Prior Publication Data

US 2021/0089304 A1 Mar. 25, 2021

(51) Int. Cl.
| | |
|---|---|
| *G06F 9/30* | (2018.01) |
| *G06F 17/16* | (2006.01) |
| *G06F 9/38* | (2018.01) |
| *G06F 9/54* | (2006.01) |

(52) U.S. Cl.
CPC ...... *G06F 9/30036* (2013.01); *G06F 9/30101* (2013.01); *G06F 9/3877* (2013.01); *G06F 9/544* (2013.01); *G06F 17/16* (2013.01)

(58) Field of Classification Search
CPC .... G06F 17/16; G06F 9/30036; G06F 9/3877; G06F 9/3893; G06F 9/30101; G06F 9/544; G06F 9/3001
See application file for complete search history.

(56) References Cited

U.S. PATENT DOCUMENTS

| | | | |
|---|---|---|---|
| 11,195,095 B2 * | 12/2021 | Matveev | G06F 9/5027 |
| 2005/0193050 A1 | 9/2005 | Sazegari | |
| 2010/0274990 A1 | 10/2010 | Wilder et al. | |
| 2014/0365548 A1 | 12/2014 | Mortensen | |
| 2018/0301189 A1 | 10/2018 | Hu et al. | |

(Continued)

FOREIGN PATENT DOCUMENTS

KR     20170027325 A     3/2017

OTHER PUBLICATIONS

International Search Report and Written Opinion dated Jan. 8, 2021 in Application No. PCT/US2020/052211, 9 pages.

(Continued)

*Primary Examiner* — Ernest Unelus

(57) ABSTRACT

A processing unit such as a graphics processing unit (GPU) includes a plurality of vector signal processors (VSPs) that include multiply/accumulate elements. The processing unit also includes a plurality of registers associated with the plurality of VSPs. First portions of first and second matrices are fetched into the plurality of registers prior to a first round that includes a plurality of iterations. The multiply/accumulate elements perform matrix multiplication and accumulation on different combinations of subsets of the first portions of the first and second matrices in the plurality of iterations prior to fetching second portions of the first and second matrices into the plurality of registers for a second round. The accumulated results of multiplying the first portions of the first and second matrices are written into an output buffer in response to completing the plurality of iterations.

20 Claims, 7 Drawing Sheets

(56) References Cited

U.S. PATENT DOCUMENTS

2019/0171448 A1    6/2019   Chen et al.

OTHER PUBLICATIONS

U.S. Appl. No. 15/855,637, filed Feb. 27, 2019 in the name of Jiasheng Chen, et al., 28 pages.
"AMD Unveils World's First 7nm Datacenter GPUs—Powering the Next Era of Artificial Intelligence, Cloud Computing and High Performance Computing (HPC)", AMD Press Release, Nov. 6, 2018, 4 pages.
International Preliminary Report on Patentability dated Apr. 7, 2022 for PCT/US2020/052211, 6 pages.

\* cited by examiner

MATRIX MULTIPLICATION UNIT WITH FLEXIBLE PRECISION OPERATIONS

BACKGROUND

Data-intensive applications such as deep learning, high performance computing (HPC), cloud computing, and graphics rendering are used to address challenges including large-scale simulation, climate change, computational biology, disease prevention, financial modeling, and the like. Processing units such as graphics processing units (GPUs) are designed to provide high floating-point performance and high memory bandwidth speeds to support the data-intensive applications. For example, each single-instruction-multiple-data (SIMD) element in the GPU includes four vector signal processors (VSPs) to perform concurrent operations such as matrix multiplications. A corresponding software platform allows engineers to harness the resources of the high-performance GPUs. In some cases, the software platform supports deep learning operations (dlops) that provide flexible mixed-precision capabilities to support dynamic workloads such as training neural networks and running inference against the trained neural networks. Implementing the flexible mixed-precision capabilities requires incorporating complex multiplexers, a crossbar switch between the VSPs in the GPU, and increased complexity in the layout of registers such as vector general-purpose registers (VGPRs).

BRIEF DESCRIPTION OF THE DRAWINGS

The present disclosure is better understood, and its numerous features and advantages made apparent to those skilled in the art by referencing the accompanying drawings. The use of the same reference symbols in different drawings indicates similar or identical items.

DETAILED DESCRIPTION

Figure 1:
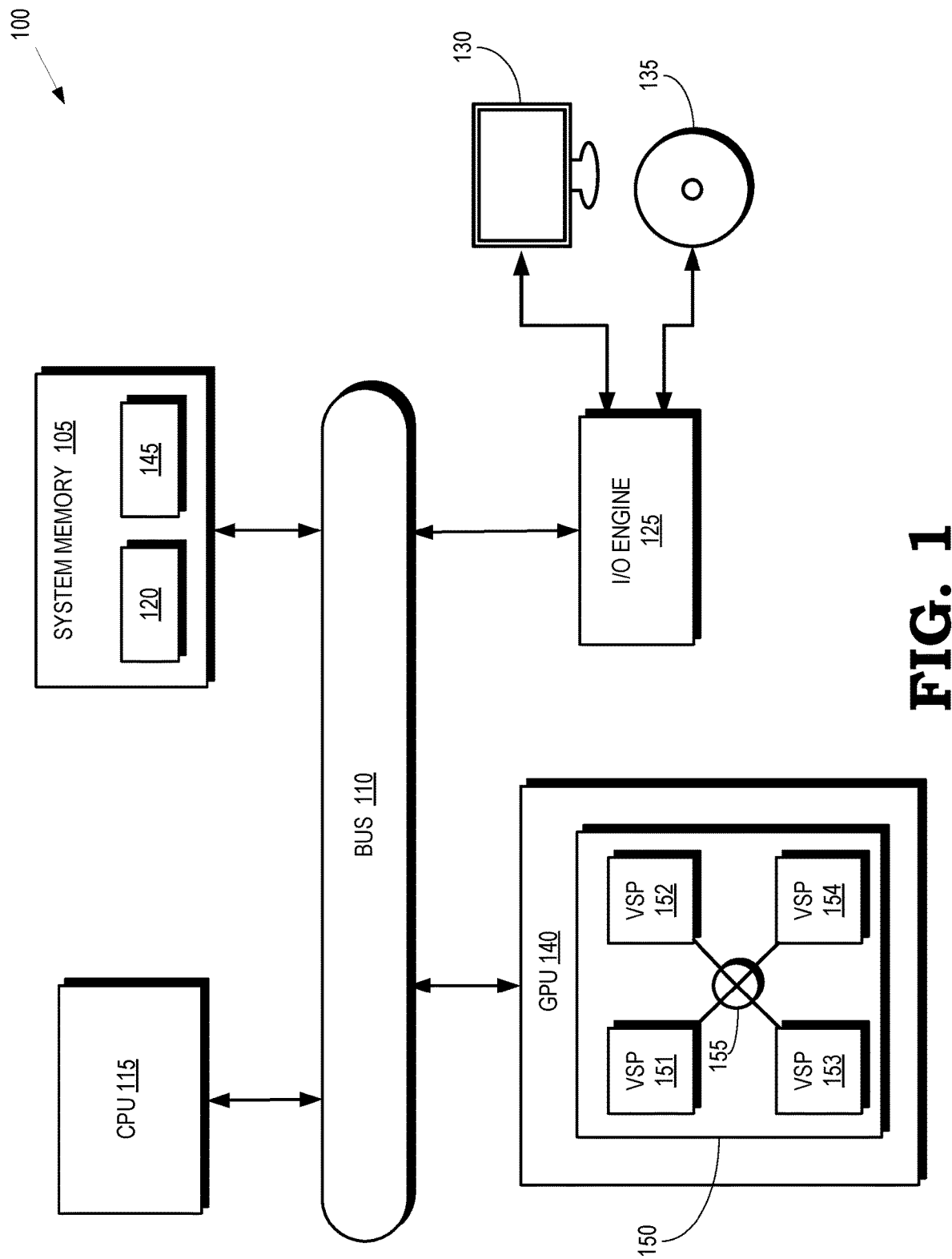
FIG. 1 is a block diagram of a processing system that supports flexible precision matrix operations according to some embodiments.

Data-intensive applications consume large amounts of processing resources including memory, processing power, and bandwidth to move data between the memory and the processors. These applications therefore require hardware that provides a higher computation density at a lower power, as well as supporting different precisions for floating-point and integer operations. The performance of a GPU is limited by the precision of the operands and the deep learning operations (dlops) rate per area and per watt. The performance of a 32-bit streaming processor is extensible to support higher throughput multi-precision dlops by implementing an extended accumulation register file. However, the improvement in the dlops rate is limited by an architecture that separates the two VGPR files and does not make the logic of the matrix pipeline available for general computation such as HPC applications that require double precision.

FIGS. 1-7 disclose techniques for reducing power consumption per unit area in high-performance processing units during matrix multiplication of first and second matrices, while increasing the re-use of data and therefore reducing bandwidth consumption in a processing unit that includes a plurality of vector signal processors (VSPs). The VSPs cooperatively fetch portions of the first and second matrices from memory into corresponding registers (such as vector general-purpose registers, VGPRs) implemented a single-instruction-multiple-data (SIMD) element of the processing unit. In a first iteration, the portions of the first and second matrices are written from the registers into corresponding first and second buffers in the plurality of VSPs. Multiply-accumulate elements in the plurality of VSPs combine the values in the first and second buffers and store the results for accumulation with subsequent results. In subsequent iterations, the portions of the first matrices are rotated through the first buffers of the plurality of VSPs so that different combinations of portions of the first and second matrices are multiplied and accumulated by the plurality of VSPs. For example, if four VSPs are implemented in the SIMD element, four portions of the first matrix and four portions of the second matrix are written into four first buffers and four second buffers. The multiply-accumulate elements in the VSPs perform the matrix multiplication operations and then the portions of the first matrix are rotated into different first buffers in different VSPs via a crossbar switch. The multiply-accumulate elements concurrently perform another set of matrix multiplication operations and the process is repeated four times. The accumulated results for each of the plurality of VSPs is written back to the VGPRs (or to a corresponding output buffer before the VGPRs) in response to performing the multiply/accumulation of each portion of the first matrix with each portion of the second matrix that is stored in the registers associated with the plurality of VSPs. New portions of the first and second matrices are then fetched into the registers for the next round of matrix multiplication operations.

FIG. 1 is a block diagram of a processing system 100 that supports flexible precision matrix operations according to some embodiments. The processing system 100 includes or has access to a system memory 105 or other storage component that is implemented using a non-transitory computer readable medium such as a dynamic random access memory (DRAM). However, some embodiments of the memory 105 are implemented using other types of memory including static random access memory (SRAM), nonvolatile RAM, and the like. The processing system 100 also includes a bus 110 to support communication between entities implemented in the processing system 100, such as the memory 105. Some embodiments of the processing system 100 include other buses, bridges, switches, routers, and the like, which are not shown in FIG. 1 in the interest of clarity.

The processing system 100 includes a central processing unit (CPU) 115. Some embodiments of the CPU 115 include multiple processing elements (not shown in FIG. 1 in the interest of clarity) that execute instructions concurrently or in parallel. The processing elements are referred to as processor cores, compute units, or using other terms. The CPU 115 is connected to the bus 110 therefore communicates with the memory 105 via the bus 110. The CPU 115 executes instructions such as program code 120 stored in the memory 105 and the CPU 115 stores information in the memory 105 such as the results of the executed instructions. The CPU 115 is also able to initiate graphics processing by issuing draw calls.

An input/output (I/O) engine 125 handles input or output operations associated with a display 130, as well as other elements of the processing system 100 such as keyboards, mice, printers, external disks, and the like. The I/O engine 125 is coupled to the bus 110 so that the I/O engine 125 is able to communicate with the memory 105, the CPU 115, or other entities that are connected to the bus 110. In the illustrated embodiment, the I/O engine 125 reads information stored on an external storage component 135, which is implemented using a non-transitory computer readable medium such as a compact disk (CD), a digital video disc (DVD), and the like. The I/O engine 125 also writes information to the external storage component 135, such as the results of processing by the CPU 115.

The processing system 100 includes a graphics processing unit (GPU) 140 that renders images for presentation on the display 130. For example, the GPU 140 renders objects to produce values of pixels that are provided to the display 130, which uses the pixel values to display an image that represents the rendered objects. Some embodiments of the GPU 140 are used for general purpose computing. In the illustrated embodiment, the GPU 140 communicates with the memory 105 (and other entities that are connected to the bus 110) over the bus 110. However, some embodiments of the GPU 140 communicate with the memory 105 over a direct connection or via other buses, bridges, switches, routers, and the like. The GPU 140 executes instructions stored in the memory 105 and the GPU 140 stores information in the memory 105 such as the results of the executed instructions. For example, the memory 105 stores a copy 145 of instructions that represent a program code that is to be executed by the GPU 140.

The GPU 140 includes one or more single-instruction-multiple-data (SIMD) units 150, although only one is shown in FIG. 1 in the interest of clarity. The SIMD unit 150 includes multiple processing elements such as vector signal processors (VSPs) 151, 152, 153, 154, which are collectively referred to herein as "the VSPs 151-154." In the illustrated embodiment, the VSPs 151-154 interconnected by a crossbar switch 155 that provides communication pathways for conveying information between the VSPs 151-154. The VSPs 151-154 perform vector operations on information fetched from the system memory 105, e.g., into registers such as vector general-purpose registers (VGPRs), which are not shown in FIG. 1 in the interest of clarity.

In order to perform matrix multiplication operations, the VSPs 151-154 cooperatively fetch information from the system memory 105, perform the matrix multiplication operations on subsets of the information, and then exchange the subsets of the information to allow the VSPs 151-154 to perform the matrix multiplication operations on different combinations of the subsets. Some embodiments of the VSPs 151-154 cooperatively fetch portions of matrices from the system memory 105 and then perform matrix multiplication operations on the fetched portions of the matrices. The portions are rotated through the VSPs 151-154, e.g., via the crossbar switch 155, so that matrix multiplications of different portions of the matrices are performed and accumulated prior to fetching additional portions of the matrices from the system memory 105. In some embodiments, first portions of first and second matrices are fetched into the VGPRs prior to a first round that includes multiple iterations. Multiply/accumulate elements in the VSPs 151-154 perform matrix multiplication and accumulation on different combinations of subsets of the first portions of the first and second matrices in the multiple iterations prior to fetching second portions of the first and second matrices into the VGPRs for a second round.

Some embodiments of the GPU 140 are implemented as a 32-bit streaming processor that flexibly operates at different precisions. For example, the GPU 140 performs regular math and matrix math operations using single precision operands, double precision operands, FP16 operands, and 8-bit integer operands.

Figure 2:
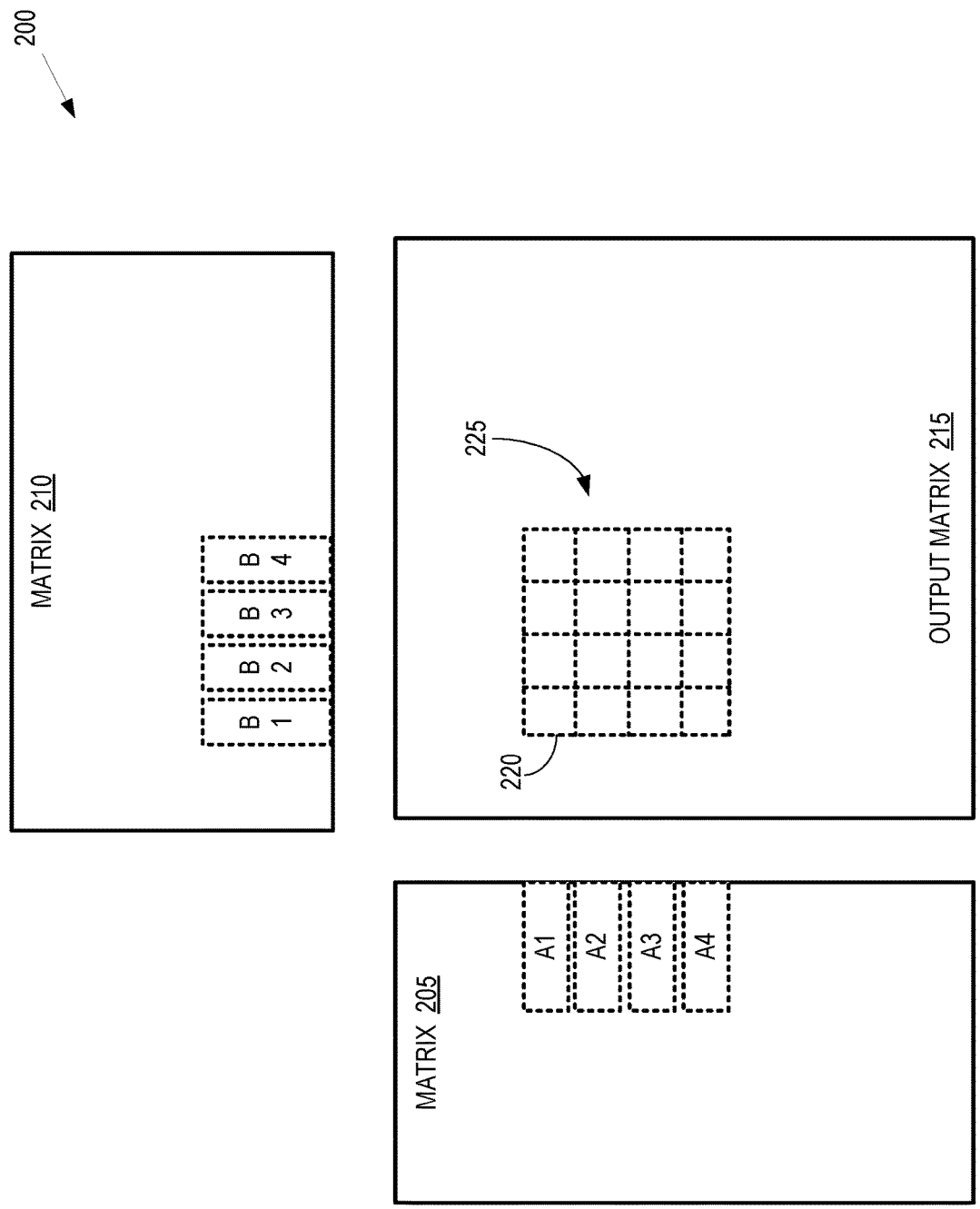
FIG. 2 is a block diagram of a matrix multiplication of two matrices according to some embodiments.

FIG. 2 is a block diagram of a matrix multiplication 200 of two matrices according to some embodiments. The matrix multiplication 200 is performed by some embodiments of the GPU 140 shown in FIG. 1. The matrix multiplication 200 is used to multiply matrix 205 and matrix 210 to generate an output matrix 215. In the illustrated embodiment, the matrix multiplication 200 is performed by multiplying submatrices (or subsets or portions) from the matrices 205, 210 and accumulating the appropriate results to generate corresponding submatrices of the output matrix 215. For example, the submatrix A1 from the matrix 205 and the submatrix B1 from the matrix 210 are multiplied and accumulated to generate the submatrix 220 of the output matrix 215.

As discussed herein, groups of submatrices of the matrices 205, 210 are cooperatively fetched from system memory by multiple VSPs in a SIMD and then the VSPs share the fetched data to perform matrix multiplications and accumulation of results for different combinations of the submatrices. In the illustrated embodiment, the submatrices A1, A2, A3, A4 from the matrix 205 and the submatrices B1, B2, B3, B4 from the matrix 210 are cooperatively fetched by four VSPs such as the VSPs 151-154 shown in FIG. 1. Four sets of matrix multiplications are then performed and accumulated to generate elements in the portion 225 of the output matrix 215.

The sets of matrix multiplications are performed in iterations. In the first iteration, the submatrix A1 is accessed from the buffer in one of the VSPs and via a crossbar switch by the other VSPs. The four VSPs perform the matrix multiplications:

A1×B1

A1×B2

A1×B3

A1×B4

The submatrices A1, A2, A3, A4 from the matrix 205 are rotated through the VSPs and the submatrices B1, B2, B3, B4 from the matrix 210 remain in their original locations for the second iteration. As used herein, the term "rotate" refers to changing the submatrices A1, A2, A3, A4 that are accessed by the VSPs via their internal buffer or the crossbar switch. In the illustrated embodiment, rotation of the submatrices A1, A2, A3, A4 following the first iteration causes the VSPs to access the submatrix A2 via an internal buffer or the crossbar switch. However, other types or patterns of rotation are implemented using the internal buffers and crossbar switch in other embodiments.

In the second iteration, the four VSPs perform the matrix multiplications:

A2×B1

A2×B2

A2×B3

A2×B4

The submatrices A1, A2, A3, A4 from the matrix 205 are again rotated through the VSPs and the submatrices B1, B2, B3, B4 from the matrix 210 remain in their original locations for the third iteration. In the third iteration, the four VSPs perform the matrix multiplications:

A3×B1

A3×B2

A3×B3

A3×B4

The submatrices A1, A2, A3, A4 from the matrix 205 are again rotated through the VSPs and the submatrices B1, B2, B3, B4 from the matrix 210 remain in their original locations for the fourth iteration. In the fourth iteration, the four VSPs perform the matrix multiplications:

A4×B1

A4×B2

A4×B3

A4×B4

At this point, the VSPs have collectively performed matrix multiplications of all the combinations of the submatrices A1, A2, A3, A4 and the submatrices B1, B2, B3, B4 from the matrix 210 that are needed to generate the corresponding contributions to the portion 225 of the output matrix 215. In response to completing the fourth iteration, the accumulated results are written and the VSPs cooperatively fetch other submatrices of the matrices 210, 215 to perform another round of the iterations.

Figure 3:
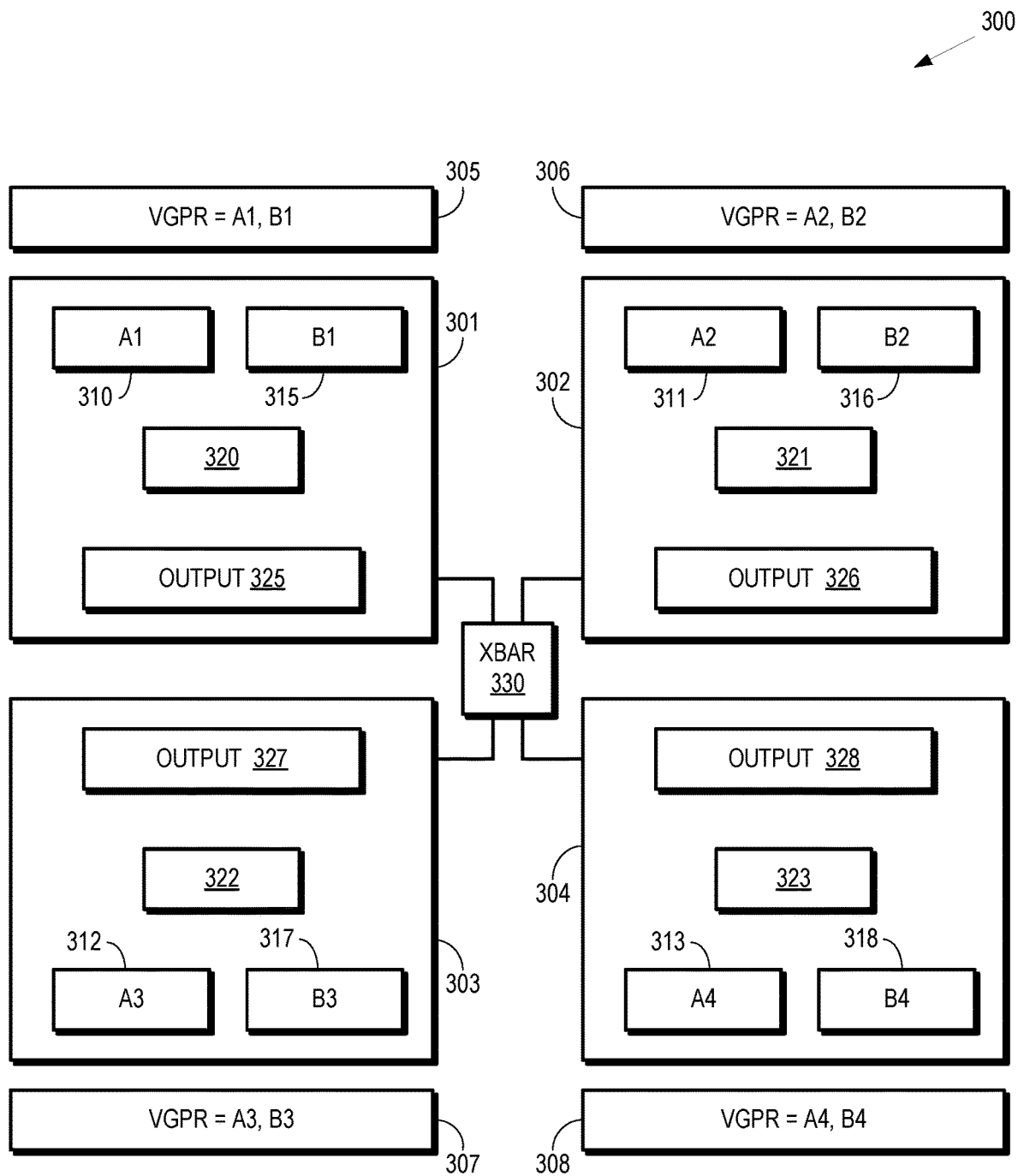
FIG. 3 is a block diagram of a single-instruction-multiple-data (SIMD) unit that includes four vector signal processors (VSPs) that cooperatively fetch portions of matrices from system memory to perform matrix multiplication according to some embodiments.

FIG. 3 is a block diagram of a SIMD unit 300 that includes four VSPs 301, 302, 303, 304 that cooperatively fetch portions of matrices from system memory to perform matrix multiplication according to some embodiments. The SIMD unit 300 is used to implement some embodiments of the SIMD unit 145 shown in FIG. 1. The VSPs 301-304 are associated with VGPRs 305, 306, 307, 308 (collectively referred to herein as "the VGPRs 305-308") that store portions of two matrices that are to be multiplied together, e.g., the matrices 205, 210 shown in FIG. 2. As discussed herein, the portions of the matrices are cooperatively fetched from system memory into the VGPRs 305-308 at the beginning of a round of matrix multiplication operations involving the fetched portions.

The VSPs 301-304 include first buffers 310, 311, 312, 313 (collectively referred to herein as "the first buffers 310-313") and second buffers 315, 316, 317, 318 (collectively referred to herein as "the second buffers 315-318"). The first buffers 310-313 store subsets of the portions of the first matrix stored in the VGPRs 305-308 and the second buffers 315-318 store subsets of the portions of the second matrix stored in the VGPRs 305-308. The VSPs 301-304 also include matrix multiply/accumulate elements 320, 321, 322, 323 (collectively referred to herein as "the multiply/accumulate elements 320-323") that perform matrix multiplications on the subsets stored in the first buffers 310-313 and the second buffers 315-318. The results of the matrix multiplications are then accumulated by the matrix multiply/accumulate elements 320-323.

The VSPs 301-304 are interconnected by a crossbar switch 330 that allows contents of the first buffers 310-313 to be conveyed or rotated between the VSPs 301-304. In the illustrated embodiment, the portions A1, A2, A3, A4 of the first matrix and the portions B1, B2, B3, B4 of the second matrix are fetched from system memory into the VGPRs 305-308 prior to initiating a round of matrix multiplication operations. The portions A1, A2, A3, A4 of the first matrix are copied from the VGPRs 305-308 into the corresponding first buffers 310-313 and the portions B1, B2, B3, B4 of the second matrix are copied from the VGPRs 305-308 into the corresponding second buffers 315-318. During a first iteration of the round, the multiply/accumulate elements 320-323 perform matrix multiplication on the contents of the second buffers 315-318 and either the first buffers 310-313 or values that are conveyed from the first buffers 310-313 via the crossbar switch 330. The contents of the first buffers 310-313 are then rotated and another round of iterations of the multiply/accumulate process is performed. The process is iterated until all combinations of the portions A1, A2, A3, A4 of the first matrix and the portions B1, B2, B3, B4 of the second matrix have been multiplied together. The multiply/accumulate elements 320-323 then write the accumulated results to corresponding output buffers 325, 326, 327, 328 (collectively referred to herein as "the output buffers 325-328"). The output buffers 325-328 are not used in some embodiments and the accumulated results are instead written directly to the VGPRs 305-308.

Figure 4:
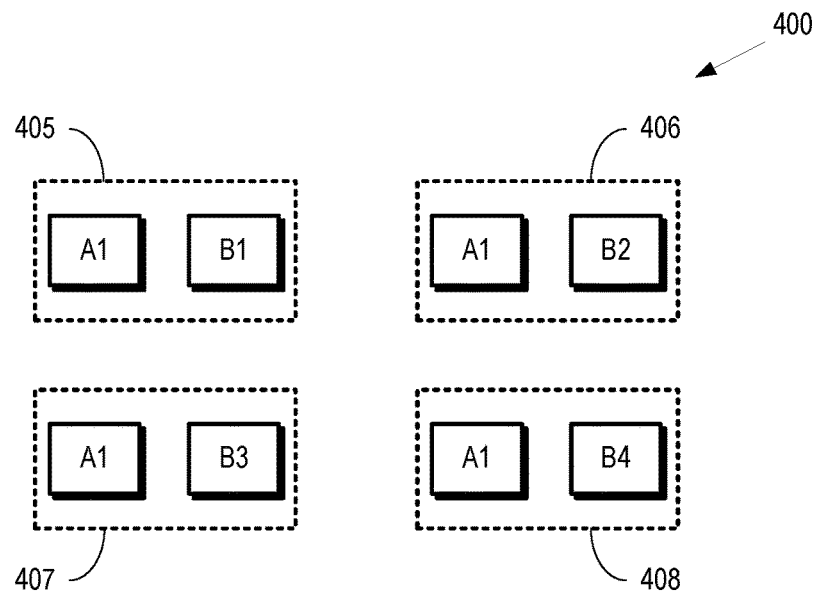
FIG. 4 is a block diagram of VSP buffers during first and second iterations of a sequence of iterations in a round of matrix multiplications according to some embodiments.
Figure 4:
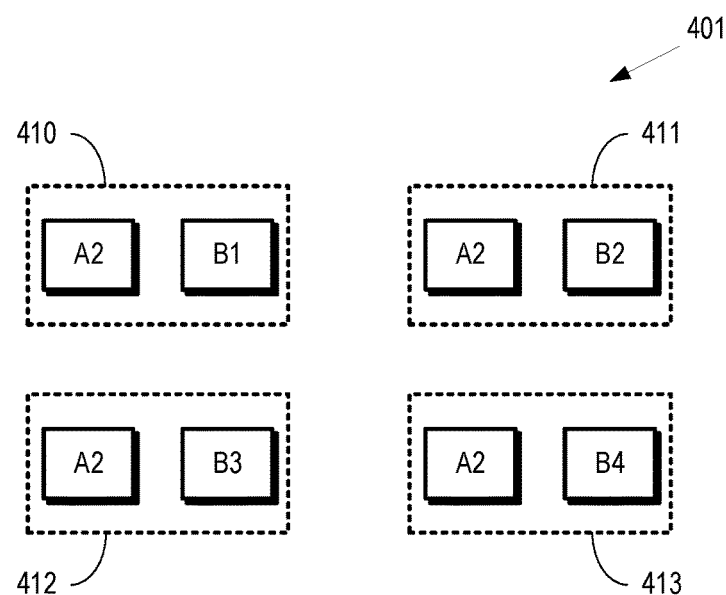

FIG. 4 is a block diagram of matrix multiplications performed during first and second iterations 400, 401 of a sequence of iterations in a round of matrix multiplications according to some embodiments. Prior to beginning the round of iterations, the portions A1, A2, A3, A4 and portions B1, B2, B3, B4 are loaded into corresponding VGPR and buffers in the VSPs. In the illustrated embodiment, the buffers in a first VSP include the portions A1, B1 of first and second matrices, buffers in the second VSP include the portions A2, B2 of first and second matrices, buffers in the third VSP include the portions A3, B3 of first and second matrices, and buffers in the fourth VSP include the portions A4, B4 of first and second matrices, respectively.

During the first iteration 400, arithmetic logic units in the corresponding VSPs form submatrix pairs 405, 406, 407, 408, which are collectively referred to herein as the submatrix pairs 405-408. The arithmetic logic unit multiplies the pairs 405-408 and accumulate the results. Some embodiments of the arithmetic logic units correspond to the multiply/accumulate elements 320-323 in the VSPs 301-304 shown in FIG. 3. Depending on the iteration (or cycle), the arithmetic logic units access values of the submatrix pairs 405-408 from buffers in the VSP or via the crossbar switch, as discussed below. In the illustrated embodiment, the arithmetic logic unit in the first VSP accesses the portions A1, B1 from buffers to form the pair 405 in the first iteration 400. The arithmetic logic unit then performs matrix multiplications on the contents of the buffers and accumulates the results. The arithmetic logic units in the other VSPs access the portion A1 via a crossbar switch during the first iteration 400. The arithmetic logic units then perform matrix multiplications on the pairs 406-408. At the end of the first iteration 400, the portions A1, A2, A3, A4 are rotated and the portions B1, B2, B3, B4 are not rotated.

During the second iteration 401, the arithmetic logic units in the corresponding VSPs form submatrix pairs 410, 411, 412, 413, which are collectively referred to herein as the submatrix pairs 410-413. The arithmetic logic unit multiplies the pairs 410-413 and accumulate the results. In the illustrated embodiment, the arithmetic logic unit in the second VSP accesses the portions A2, B2 from buffers to form the pair 411. The arithmetic logic unit then performs matrix multiplications on the contents of the buffers and accumulates the results. The arithmetic logic units in the other VSPs access the portion A2 via a crossbar switch. The arithmetic logic units then perform matrix multiplications on the pairs 410, 412, 413. At the end of the second iteration 401, the portions A1, A2, A3, A4 are rotated and the portions B1, B2, B3, B4 are not rotated.

Figure 5:
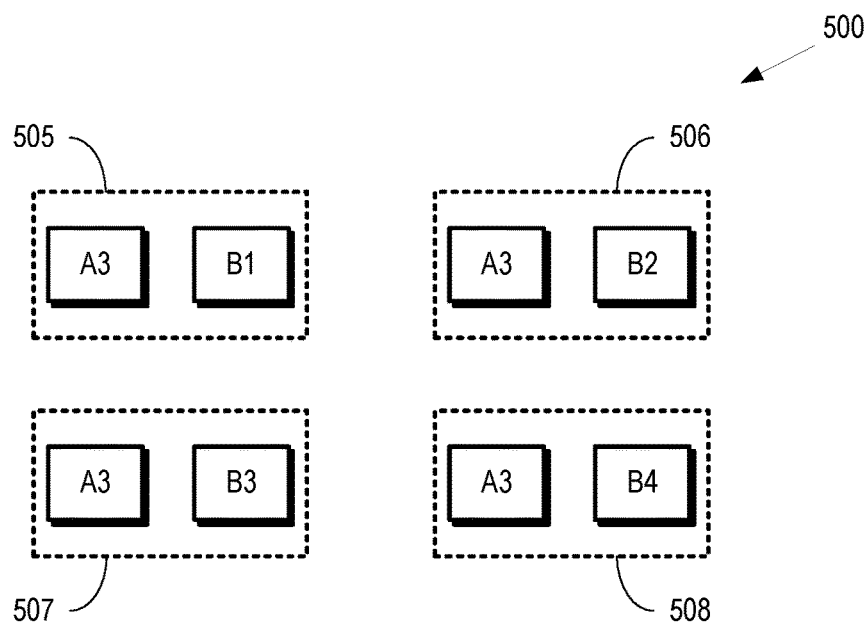
FIG. 5 is a block diagram of VSP buffers during third and fourth iterations of a sequence of iterations in a round of matrix multiplications according to some embodiments.
Figure 5:
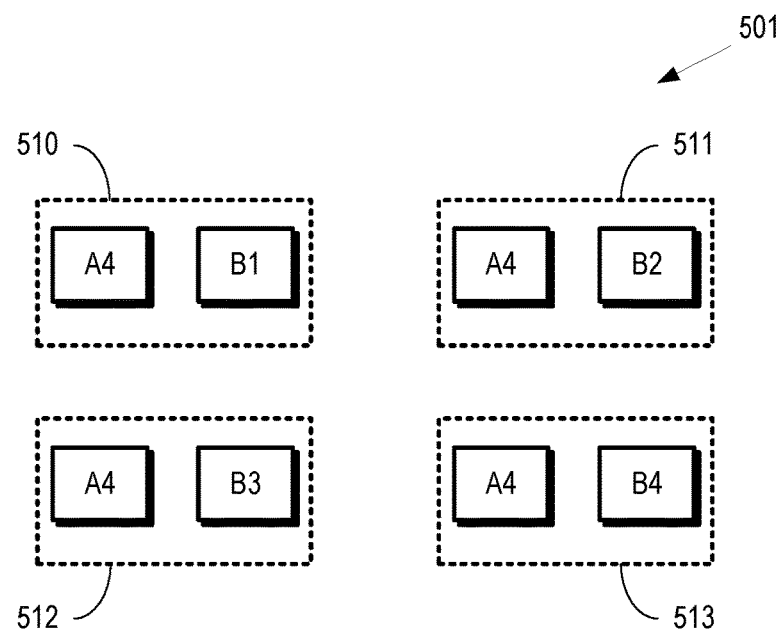

FIG. 5 is a block diagram of matrix multiplications performed during third and fourth iterations 500, 501 of a sequence of iterations in a round of matrix multiplications according to some embodiments. In some embodiments, the third and fourth iterations 500, 501 are subsequent to, and in the same round of matrix multiplication operations as, the first and second iterations 400, 401 shown in FIG. 4. The portions A1, A2, A3, A4 and portions B1, B2, B3, B4 are loaded into corresponding VGPR and buffers in the VSPs. In the illustrated embodiment, the buffers in a first VSP include the portions A1, B1 of first and second matrices, buffers in the second VSP include the portions A2, B2 of first and second matrices, buffers in the third VSP include the portions A3, B3 of first and second matrices, and buffers in the fourth VSP include the portions A4, B4 of first and second matrices, respectively.

During the third iteration 500, the arithmetic logic units in the corresponding VSPs form submatrix pairs 505, 506, 507, 508, which are collectively referred to herein as the submatrix pairs 505-508. The arithmetic logic unit multiplies the pairs 505-508 and accumulates the results. In the illustrated embodiment, the arithmetic logic unit in the third VSP accesses the portions A3, B3 from buffers to form the pair 507. The arithmetic logic unit then performs matrix multiplications on the contents of the buffers and accumulates the results. The arithmetic logic units in the other VSPs access the portion A3 via a crossbar switch. The arithmetic logic units then perform matrix multiplications on the pairs 505, 506, 508. At the end of the third iteration 500, the portions A1, A2, A3, A4 are rotated and the portions B1, B2, B3, B4 are not rotated.

During the fourth iteration 501, the arithmetic logic units in the corresponding VSPs form submatrix pairs 510, 511, 512, 513, which are collectively referred to herein as the submatrix pairs 510-513. The arithmetic logic unit multiplies the pairs 510-513 and accumulates the results. In the illustrated embodiment, the arithmetic logic unit in the fourth VSP accesses the portions A4, B4 from buffers to form the pair 513. The arithmetic logic unit then performs matrix multiplications on the contents of the buffers and accumulates the results. The arithmetic logic units in the other VSPs access the portion A4 via a crossbar switch. The arithmetic logic units then perform matrix multiplications on the pairs 510-512. At the end of the fourth iteration 501, the arithmetic logic units write the accumulated results to corresponding output buffers such as the output buffers 325-328 shown in FIG. 3. New portions of the first and second matrices are then fetched into VGPRs associated with the VSPs and the portions are copied into the corresponding buffers to begin another round of matrix multiplications.

Figure 6:
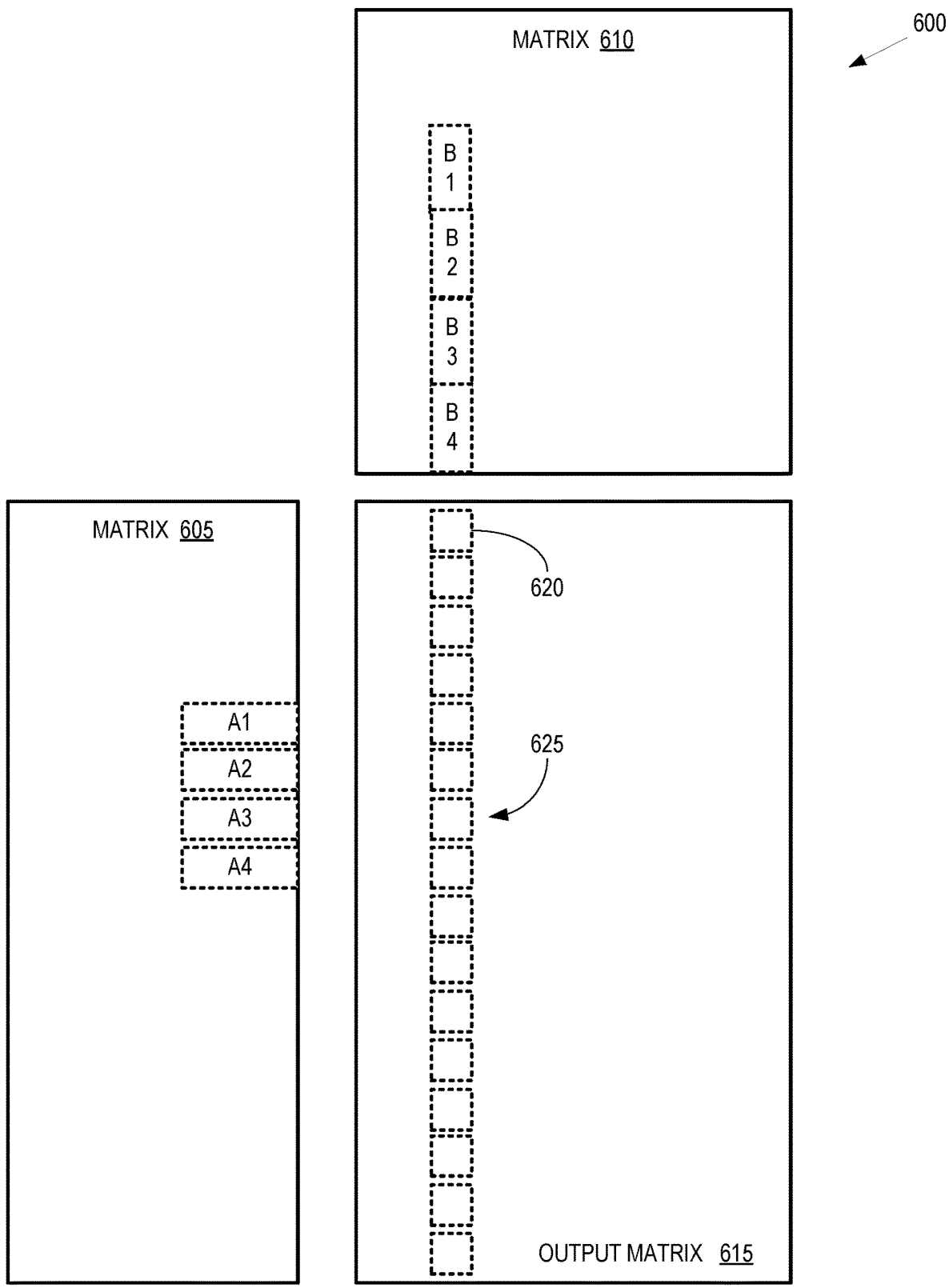
FIG. 6 is a block diagram of a matrix multiplication of two matrices using an alternate arrangement of the submatrices in one of the matrices according to some embodiments.

FIG. 6 is a block diagram of a matrix multiplication 600 of two matrices using an alternate arrangement of the submatrices in one of the matrices according to some embodiments. The matrix multiplication 600 is performed by some embodiments of the GPU 140 shown in FIG. 1. The matrix multiplication 600 is used to multiply matrix 605 and matrix 610 to generate an output matrix 615. In the illustrated embodiment, the matrix multiplication 600 is performed by multiplying submatrices (or subsets or portions) from the matrices 605, 610 and accumulating the appropriate results to generate corresponding submatrices of the output matrix 615. For example, the submatrix A1 from the matrix 605 and the submatrix B1 from the matrix 610 are multiplied and accumulated to generate the submatrix 620 of the output matrix 615. The matrix multiplication 600 differs from the matrix multiplication 200 shown in FIG. 2 by arranging the submatrices of the matrix 610 in a column-based orientation instead of a row-based orientation. Thus, the portion 625 of the output matrix 615 that is generated by multiplying the submatrices A1, A2, A3, A4 and the submatrices B1, B2, B3, B4 as a column-based configuration instead of the array-based configuration of the portion 225 of the output matrix 215 shown in FIG. 2.

Figure 7:
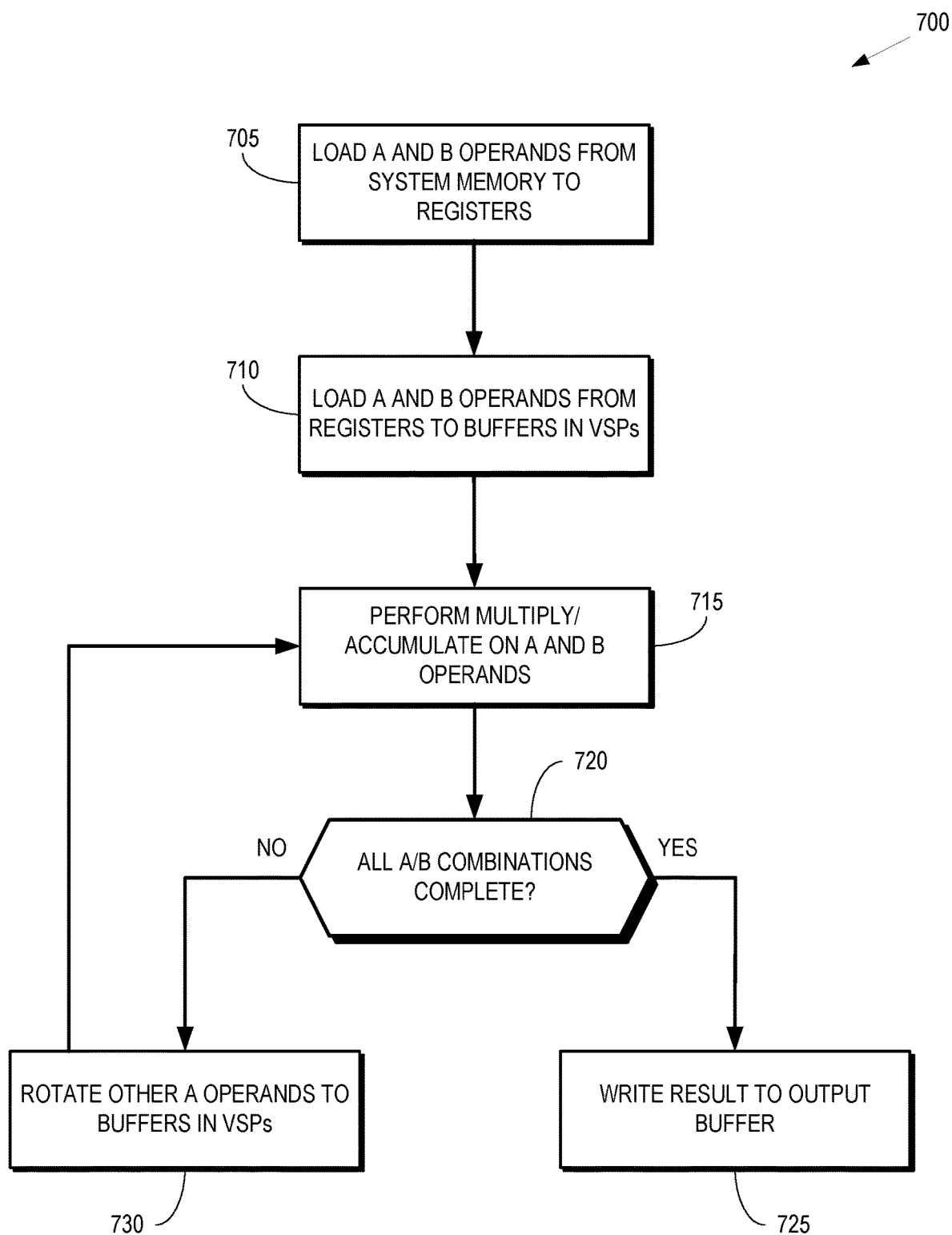
FIG. 7 is a block diagram of a method of performing a round of matrix multiplications by rotating operands through buffers in multiple VSPs of a processing unit according to some embodiments.

FIG. 7 is a block diagram of a method 700 of performing a round of matrix multiplications by rotating operands through buffers in multiple VSPs of a processing unit according to some embodiments. The method 700 is implemented in some embodiments of the GPU 140 shown in FIG. 1 and the SIMD unit 300 shown in FIG. 3.

At block 705, portions of a (first) matrix A and a (second) matrix B are fetched from system memory and stored in registers associated with the VSPs, such as the VGPRs 305-308 shown in FIG. 3. The portions of matrix A and matrix B are also referred to herein as the A operands and the B operands for the matrix multiplication operation, which is performed by multiply/accumulate units in the VSPs.

At block 710, the A and B operands are loaded from the registers into buffers of the VSPs, such as the first buffers 310-313 and the second buffers 315-318 shown in FIG. 3.

At block 715, an iteration of the matrix multiply operations begins and the multiply/accumulate units in the VSPs perform multiply and accumulate operations on the A and B operands stored in the respective buffers of the VSPs. As discussed herein, one of the A operands is accessed from a respective buffer in a corresponding VSP and the value of this A operand is accessed by the other VSPs via the crossbar switch.

At decision block 720, the processing unit determines whether the matrix multiply/accumulate has been performed on all combinations of the A and B operands. In some embodiments, the number of iterations is equal to the number of VSPs so that each of the A operands is multiplied with each of the B operands before the round is complete. If the multiply/accumulate operation has been performed on all combinations, the method 700 flows to block 725 and the multiply/accumulate units write the accumulated results to corresponding output buffers such as the output buffers 325-328 shown in FIG. 3. If the multiply/accumulate operation has not been performed on all combinations of the A and B operands, the method 700 flows to block 730.

At block 730, the A operands are rotated around the VSPs. In some embodiments, the A operands are rotated by conveying information representative of the A operands via a crossbar switch such as the crossbar switch 330 shown in FIG. 3. Rotation of the A operands is illustrated in FIGS. 4 and 5. The method 700 then flows back to block 715 to begin a subsequent iteration of the round.

A computer readable storage medium includes any non-transitory storage medium, or combination of non-transitory storage media, accessible by a computer system during use to provide instructions and/or data to the computer system. Such storage media includes, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. Some embodiments of the computer readable storage medium are embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

In some embodiments, certain aspects of the techniques described above are implemented by one or more processors of a processing system executing software. The software includes one or more sets of executable instructions stored or otherwise tangibly embodied on a non-transitory computer readable storage medium. The software includes the instructions and certain data that, when executed by the one or more processors, manipulate the one or more processors to perform one or more aspects of the techniques described above. The non-transitory computer readable storage medium includes, for example, a magnetic or optical disk storage device, solid state storage devices such as Flash memory, a cache, random access memory (RAM) or other non-volatile memory device or devices, and the like. The executable instructions stored on the non-transitory computer readable storage medium are in source code, assembly language code, object code, or other instruction format that is interpreted or otherwise executable by one or more processors.

Note that not all of the activities or elements described above in the general description are required, that a portion of a specific activity or device are not required, and that one or more further activities are performed, or elements included, in addition to those described. Still further, the order in which activities are listed are not necessarily the order in which they are performed. Also, the concepts have been described with reference to specific embodiments. However, one of ordinary skill in the art appreciates that various modifications and changes could be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. An apparatus comprising:
   a plurality of vector signal processors (VSPs) comprising multiply and accumulate elements; and
   a plurality of registers associated with the plurality of VSPs, wherein first portions of first and second matrices are fetched into the plurality of registers prior to a first round of matrix operations that includes a plurality of iterations, wherein the multiply and accumulate elements perform matrix multiplication and accumulation on different combinations of subsets of the first portions of the first and second matrices in the plurality of iterations prior to fetching second portions of the first and second matrices into the plurality of registers for a second round of matrix operations,
   wherein, during a current iteration of the plurality of iterations, the subsets accessed by the VSPs are changed such that different VSPs access the subsets after the multiply and accumulate elements perform the matrix multiplication and accumulation for the current iteration.

2. The apparatus of claim 1, wherein the plurality of VSPs further comprise a first buffer, a second buffer, and an output buffer, and wherein the subsets of the first portions of the first and second matrices are copied from the plurality of registers to the first and second buffers in the plurality of VSPs prior to initiating the plurality of iterations.

3. The apparatus of claim 2, wherein, during a current iteration of the plurality of iterations, the multiply and accumulate elements perform matrix multiplication and accumulation on the subsets of the first portions of the first and second matrices stored in the corresponding first and second buffers during the current iteration.

4. The apparatus of claim 3, wherein, during the current iteration, the subsets of the first portions of the first matrices comprise operands that are rotated between different VSPs through a crossbar switch that interconnects the plurality of VSPs after the multiply and accumulate elements perform the matrix multiplication and accumulation for the current iteration.

5. The apparatus of claim 4, further comprising:
   a crossbar switch that interconnects the plurality of VSPs, wherein the subsets of the first portions of the first matrices are rotated to the different VSPs via the crossbar switch.

6. The apparatus of claim 1, wherein the plurality of iterations corresponds to the plurality of VSPs so that the multiply and accumulate elements perform the matrix multiplication and accumulation for all combinations of the subsets of the first portions of the first and second portions during the plurality of iterations in the first round.

7. The apparatus of claim 1, wherein the plurality of VSPs further comprise:
   output buffers, wherein the multiply and accumulate elements write accumulated results of the multiplications to the output buffer subsequent to performing the matrix multiplication and accumulation for the plurality of iterations in the first round and prior to beginning the second round.

8. The apparatus of claim 7, wherein the second portions of the first and second matrices are fetched into the plurality of registers in response to the multiply and accumulate elements writing the accumulated results to the output buffers.

9. A method comprising:
fetching first portions of first and second matrices into a plurality of registers associated with a plurality of vector signal processors (VSPs) prior to a first round of matrix operations that includes a plurality of iterations;
performing matrix multiplication and accumulation on different combinations of subsets of the first portions of the first and second matrices in the plurality of iterations;
fetching second portions of the first and second matrices into the plurality of registers for a second round of matrix operations in response to completing the plurality of iterations in the first round; and
changing, during a current iteration of the plurality of iterations, the subsets accessed by the VSPs such that different VSPs access the subsets after the matrix multiplication and accumulation for the current iteration.

10. The method of claim 9, further comprising:
copying the subsets of the first portions of the first and second matrices from the plurality of registers to first and second buffers in the plurality of VSPs prior to initiating the plurality of iterations.

11. The method of claim 10, further comprising:
performing, during a current iteration of the plurality of iterations, matrix multiplication and accumulation on the subsets of the first portions of the first and second matrices during the current iteration.

12. The method of claim 11, further comprising:
rotating, during the current iteration, the subsets of the first portions of the first matrices to different VSPs after performing the matrix multiplication and accumulation for the current iteration.

13. The method of claim 12, wherein rotating the subsets of the first portions of the first matrices to the different VSPs comprises rotating the subsets of the first portions of the first matrices via a crossbar switch that interconnects the plurality of VSPs.

14. The method of claim 11, wherein the plurality of iterations corresponds to the plurality of VSPs, and wherein performing the matrix multiplication and accumulation comprises the matrix multiplication and accumulation for all combinations of the subsets of the first and second portions during the plurality of iterations in the first round.

15. The method of claim 9, further comprising:
writing accumulated results of the multiplications to an output buffer subsequent to performing the matrix multiplication and accumulation for the plurality of iterations in the first round and prior to beginning the second round.

16. The method of claim 15, wherein fetching the second portions of the first and second matrices comprises fetching the second portions of the first and second matrices into the plurality of registers in response to writing the accumulated results to the output buffers.

17. A method, comprising:
multiplying, during each of a plurality of iterations, first portions of a first matrix and first portions of a second matrix;
changing, after each of the plurality of iterations, subsets of the first portion of the first matrix accessed by a vector signal processor (VSP) such that a different VSP accesses the subsets after the multiplying; and
accumulating results of multiplying the first portions of the first and second matrices during each of the plurality of iterations.

18. The method of claim 17, further comprising rotating the first portions of the first matrix via a crossbar switch that interconnects a plurality of VSPs.

19. The method of claim 17, further comprising:
fetching the first portions of the first matrix and the first portions of the second matrix into vector general-purpose registers (VGPRs) associated with the VSPs; and
copying the first portions of the first matrix and the first portions of the second matrix from the VGPRs into first and second buffers in the VSPs, respectively, prior to beginning the plurality of iterations.

20. The method of claim 17, further comprising:
writing the accumulated results of multiplying the first portions of the first and second matrices into an output buffer in response to completing the plurality of iterations.

* * * * *